(12) United States Patent
Shang et al.

(10) Patent No.: US 12,110,023 B2
(45) Date of Patent: Oct. 8, 2024

(54) DRIVING DEVICE, CONTROL METHOD AND APPARATUS, AND STORAGE MEDIUM

(71) Applicant: SHENZHEN ZHUOYU TECHNOLOGY CO., LTD., Shenzhen (CN)

(72) Inventors: Zhimeng Shang, Shenzhen (CN); Jiahang Ying, Shenzhen (CN); Jianyun Ma, Shenzhen (CN)

(73) Assignee: SHENZHEN ZHUOYU TECHNOLOGY CO., LTD., Shenzhen (CN)

( * ) Notice: Subject to any disclaimer, the term of this patent is extended or adjusted under 35 U.S.C. 154(b) by 401 days.

(21) Appl. No.: 17/485,475

(22) Filed: Sep. 26, 2021

(65) Prior Publication Data
US 2022/0009489 A1    Jan. 13, 2022

Related U.S. Application Data

(63) Continuation of application No. PCT/CN2019/080227, filed on Mar. 28, 2019.

(51) Int. Cl.
*B60W 30/16* (2020.01)
*B60W 50/14* (2020.01)

(52) U.S. Cl.
CPC ........... *B60W 30/16* (2013.01); *B60W 50/14* (2013.01); *B60W 2420/403* (2013.01); *B60W 2520/10* (2013.01); *B60W 2520/12* (2013.01); *B60W 2540/10* (2013.01); *B60W 2540/215* (2020.02); *B60W 2552/00* (2020.02);
(Continued)

(58) Field of Classification Search
CPC .. B60W 30/16; B60W 50/14; B60W 2420/42; B60W 2520/10; B60W 2520/12; B60W 2540/10; B60W 2540/215; B60W 2552/00; B60W 2554/4041; B60W 2554/4042; B60W 2554/4043; B60W 2554/801; B60W 2554/802; B60W 2555/60; B60W 2720/106;
(Continued)

(56) References Cited

U.S. PATENT DOCUMENTS

2016/0082959 A1    3/2016  Park
2017/0259832 A1    9/2017  Lathrop et al.

FOREIGN PATENT DOCUMENTS

CN    201385626 Y    1/2010
CN    104477167 A    4/2015
(Continued)

OTHER PUBLICATIONS

International Search Report of PCT/CN2019/080227 (Jan. 3, 2020).

*Primary Examiner* — Brian P Sweeney

(57) ABSTRACT

The present disclosure discloses a driving device, a driving device control method and apparatus, and a storage medium. The method includes: determining whether an automatic driving state is currently available; if yes, detecting whether a user operates an acceleration controller; if the user operates the acceleration controller, receiving an output signal of the acceleration controller in real time; and finally, changing a driving speed based on a simulated acceleration control signal. According to the present disclosure, an operation on the acceleration controller can be used as an acceleration/deceleration operation in the automatic driving state, thereby improving user experience and market competitiveness.

18 Claims, 11 Drawing Sheets

(52) U.S. Cl.
CPC ............... *B60W 2554/4041* (2020.02); *B60W 2554/4042* (2020.02); *B60W 2554/4043* (2020.02); *B60W 2554/801* (2020.02); *B60W 2554/802* (2020.02); *B60W 2555/60* (2020.02); *B60W 2720/106* (2013.01); *B60W 2720/125* (2013.01)

(58) Field of Classification Search
CPC ........... B60W 2720/125; B60W 50/10; B60W 2540/12; B60W 60/0054
See application file for complete search history.

(56) References Cited

FOREIGN PATENT DOCUMENTS

| | | | |
|---|---|---|---|
| CN | 107662605 A | | 2/2018 |
| CN | 107672597 A | | 2/2018 |
| CN | 108749809 A | * | 11/2018 |
| CN | 109291930 A | | 2/2019 |
| CN | 109353340 A | | 2/2019 |
| GB | 2546767 A | | 8/2017 |

* cited by examiner

DRIVING DEVICE, CONTROL METHOD AND APPARATUS, AND STORAGE MEDIUM

RELATED APPLICATIONS

This application is a continuation application of PCT application No. PCT/CN2019/080227, filed on Mar. 28, 2019, and the content of which is incorporated herein by reference in its entirety.

TECHNICAL FIELD

The present disclosure relates to the technical field of driving control, and in particular, to a driving device, a driving device control method, a driving device control apparatus, and a storage medium.

BACKGROUND

With the rapid development of intelligent control technologies, unmanned driving has gradually evolved from the stage of conception to a trend, and more technology giants join the research and development of unmanned driving.

In the field of vehicles, such as intelligent unmanned patrol vehicles, intelligent driving is still at an early stage. All types of intelligent driving need to firstly consider the sensing capability. That is, before planning a path and making a decision for a driving behavior, an intelligent unmanned patrol vehicle needs to sense its complex surrounding environment and operating and controlling parameters of devices in the intelligent unmanned patrol vehicle. Therefore, the selection of sensing sensor(s) becomes a prerequisite for successful obstacle avoidance of the intelligent unmanned patrol vehicle.

Hence, some sensors for detecting data have been developed to meet the demands, for example, a multi-line lidar. As its name implies, the multi-line lidar has a plurality of laser transmitters distributed in a vertical direction to perform multi-beam scanning through motor rotation. Theoretically, more and denser beams contribute to more sufficient environment description. This may also lower the requirement for an algorithm. In-vehicle sensors used to detect a vehicle speed, refueling, braking, door and window control, and the like may generate a corresponding operating habits control strategy by detecting a user's operation. This makes it increasingly possible to realize unmanned driving.

In some application scenarios such as public transport, private vehicles, supermarkets, large terminals, international airports, exhibition centers, large logistics warehouses, high-end hotels, and hospitals, special unmanned driving devices with various functions may be used to provide convenience for users and save labor costs for dedicated drivers needed in some services.

However, since users are used to manual driving and the experience of manual driving, suddenly switching to unmanned driving may affect their driving experience to a certain extent. Users can no longer feel the fun of driving and may feel the lack of participation, which may cause failure to popularize unmanned driving and affect the large-scale development of products and technologies. For example, the users are used to using an accelerator or brake pedal. In an automatic driving mode, they will no longer be able to accelerate or decelerate the vehicles according to their usual driving habits, causing users' illusion of "out of control".

SUMMARY

In view of the foregoing, the present disclosure provides a driving device, a driving device control method and apparatus, and a storage medium, to resolve the technical problem that user experience is affected during unmanned driving, thereby avoiding illusion user's illusion of "out of control", and improving user experience.

According to a first aspect, the present disclosure provides a driving device control method, including: determining whether a driving device is currently in an automatic driving state; receiving an output signal of an acceleration controller in real time upon determining that the driving device is in the automatic driving state; generating a simulated acceleration control signal based on the output signal of the acceleration controller; and controlling a drive apparatus of the driving device based on the simulated acceleration control signal.

According to a second aspect, the present disclosure provides a driving device control apparatus, including: at least one storage medium storing a set of instructions for driving device control; and at least one processor in communication with the at least one storage medium, where during operation, the at least one processor executes the set of instructions to: determine whether a driving device is currently in an automatic driving state, receive an output signal of an acceleration controller in real time upon determining that the driving device is in the automatic driving state, generate a simulated acceleration control signal based on the output signal of the acceleration controller, and control a drive apparatus of the driving device based on the simulated acceleration control signal.

According to a third aspect, the present disclosure provides driving device, including: at least one storage medium storing a set of instructions for driving device control; and at least one processor in communication with the at least one storage medium, where during operation, the at least one processor executes the set of instructions to: determine whether the driving device is currently in an automatic driving state, receive an output signal of an acceleration controller in real time upon determining that the driving device is in the automatic driving state, generate a simulated acceleration control signal based on the output signal of the acceleration controller, and control a drive apparatus of the driving device based on the simulated acceleration control signal.

Embodiments of the present disclosure provide a driving device, a driving device control method and apparatus, and a storage medium. The method includes: determining whether a driving device is currently in an automatic driving state; if the driving device is in the automatic driving state, detecting in real time whether a user operates an acceleration controller; if the user operates the acceleration controller, receiving an output signal of the acceleration controller in real time; and finally, controlling a drive apparatus of the driving device based on a simulated acceleration control signal. According to the present disclosure, an operation on the acceleration controller can still be used as an acceleration/deceleration operation in the automatic driving state. This may maintain a user's operation habit and operation experience in different driving modes, avoid the user's illusion of "out of control", and improve user experience, as well as market competitiveness of products.

It should be understood that the above general description and the detailed description in the following text are only exemplary and explanatory, and should not be construed as a limitation to the present disclosure.

BRIEF DESCRIPTION OF THE DRAWINGS

To clearly describe the technical solutions in the embodiments of the present disclosure, the accompanying drawings required to describe the embodiments are briefly described below. Apparently, the accompanying drawings described below are only some exemplary embodiments of the present disclosure. A person of ordinary skill in the art may further obtain other drawings based on these accompanying drawings without creative efforts.

DETAILED DESCRIPTION

The technical solutions in some exemplary embodiments of the present disclosure will be described below with reference to the accompanying drawings. Apparently, the described exemplary embodiments are merely some rather than all of the embodiments of the present disclosure. All other embodiments obtained by a person of ordinary skill in the art based on these exemplary embodiments of the present disclosure without creative efforts shall fall within the scope of protection of the present disclosure.

The flowcharts shown in the accompanying drawings are merely examples, and neither have to include all the content and operations/steps, nor have to be performed in the order described. For example, some operations/steps may further be divided, combined or partially combined, so that an actual execution order may change as needed.

Some exemplary embodiments of the present disclosure are described in detail below with reference to the accompanying drawings. If no conflict occurs, the following exemplary embodiments and features thereof may be combined with each other.

Figure 1:
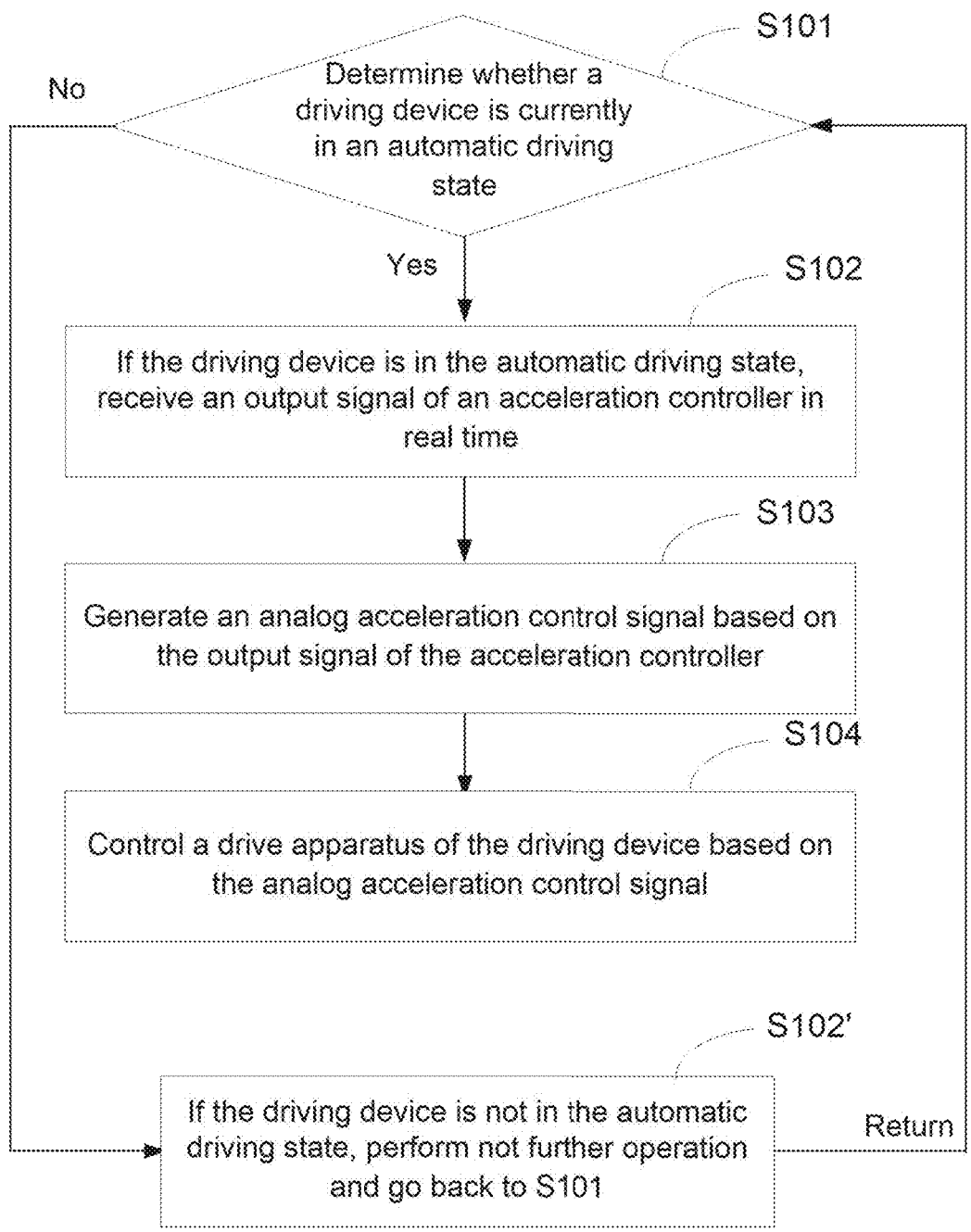
FIG. 1 is a schematic flowchart of a driving device control method according to some exemplary embodiments of the present disclosure.

FIG. 1 is a schematic flowchart of a driving device control method according to some exemplary embodiments of the present disclosure. The control method in some exemplary embodiments may be applied to a driving device such as a vehicle, a boat, or a manned aircraft. In some exemplary embodiments, the driving device may be a driving device suitable for a small group of people or an individual.

Specifically, the vehicle may be a fuel vehicle, an electric vehicle, a solar vehicle, a hybrid vehicle, or the like. The boat may be a motorboat, a speedboat, or a yacht. The manned aircraft may be a private helicopter, an air traffic aircraft that may be used by an individual in the future, or the like.

Specifically, as shown in FIG. 1, the control method includes steps S101 to S104.

S101: Determine whether a driving device is currently in an automatic driving state.

Herein, the term "automatic driving" may refer to any level of driving without or with only limited human intervention. For example, the term "automatic driving" may include, but not limited to, any one of autonomous driving, automated driving, self-driving, and driverless as interchangeable.

It should be noted that, in some exemplary embodiments, a system of driving device may be used to determine whether the driving device is in the automatic driving state or a manual driving state; or a camera may be used to obtain a video/image of a user to determine whether the driving device is in the automatic driving state. Certainly, intelligent determining may alternatively be triggered based on the user's voice, manual operation, or the like when the driving device enters a driving state, to obtain a determining result.

S102: If the driving device is in the automatic driving state, receive an output signal of an acceleration controller in real time.

It is worth mentioning that, in some exemplary embodiments, an operation of detecting the acceleration controller may be performed by identifying, by a special sensor, the operation on the acceleration controller, or by analyzing and identifying through photographing by a camera. It is easy to understand that the non-automatic driving in some exemplary embodiments refers to manual driving. In other words, various controllers such as a steering wheel, lights, doors, and windows need to be used during manual driving.

S102': If the driving device is not in the automatic driving state, perform no further operation and go back to S101.

In some exemplary embodiments, that the driving device is not in the automatic driving state may include that the driving device is in the non-automatic driving state (e.g., manually driving state) or a parking state. If the driving device is in the parking state, no processing needs to be performed in some exemplary embodiments.

S103: Generate a simulated acceleration control signal based on the output signal of the acceleration controller.

It should be particularly pointed out that the simulated acceleration control signal in implementation may a fixed value, or may be a gradient value varying with the user's operation. Certainly, in some exemplary embodiments, to achieve speed controllability, a final simulated acceleration control signal may be taken, or an average value may be taken as the final simulated acceleration control signal.

It should be particularly noted that, with the rapid development of artificial intelligence (AI) technologies, intelligent processing may further be performed on the received output signal in the present disclosure, including: pre-setting a convolutional neural network (CNN), and in an automatic driving mode, inputting the output signal into the CNN of automatic driving as priori information of the CNN. In this way, based on input information of the CNN, a more proper output signal for acceleration/steering acceleration may be generated in the present disclosure.

Specifically, the CNN in the present disclosure may include, but is not limited to, a convolutional layer, a rectified linear units layer, a pooling layer, and a fully-connected layer.

In the CNN, each convolutional layer is constituted by several convolution units, and an output signal of each convolution unit may be obtained by optimizing a back propagation algorithm. In the present disclosure, different features such as an edge, a line, and an angle of the input output signal can be extracted through convolution, or more complex features can be extracted through iteration.

In the present disclosure, rectified linear units may be used in an activation function of the rectified linear units layer.

Further, in the present disclosure, the pooling layer may be used to process a feature with great dimensions obtained after convolution, divide the feature into several regions, and take a maximum or an average value of these regions so as to a new feature with smaller dimensions.

The fully-connected layer in the present disclosure may combine all local features into a global feature to calculate a final score of each class.

S104: Control a drive apparatus of the driving device based on the simulated acceleration control signal.

For example, in some exemplary embodiments, the user may apply an operation to the acceleration controller to expect to reach a driving speed of 120 km/h (kilometers per hour). In this case, the simulated acceleration control signal is continuously detected, and the driving speed is continuously changed based on the detected simulated acceleration control signal, thus the user's desired driving speed of 120 km/h is finally reached.

According to the present disclosure, an operation on the acceleration controller may still be used as an acceleration/deceleration operation in the automatic driving state. This may maintain a user's operation habit and operation experience in different driving modes, avoid the user's illusion of "out of control", and improve user experience, as well as market competitiveness of products.

Figure 2:
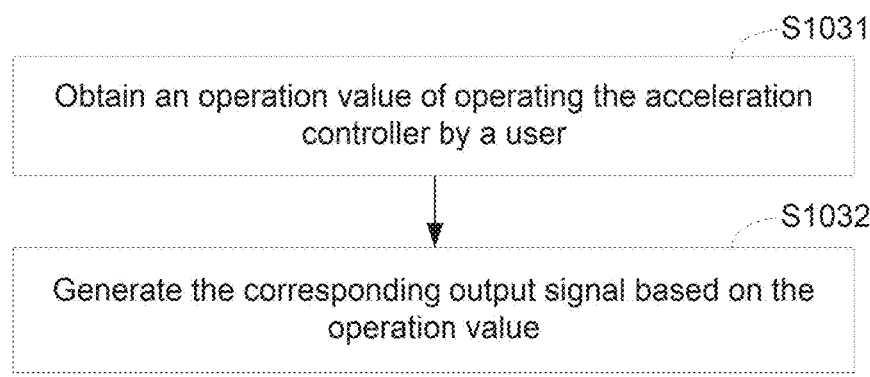
FIG. 2 is a schematic flowchart of a specific implementation of the step S103 in FIG. 1.

Further, FIG. 2 shows specific implementation steps S1031 and S1032 of the step S103 of receiving the output signal of the acceleration controller in real time as shown in FIG. 1.

Specifically, as shown in FIG. 2, an operation is performed based on an operation value of the acceleration controller in some exemplary embodiments, including the following steps.

S1031: Obtain an operation value of operating the acceleration controller by the user.

It should be noted that the operation value in some exemplary embodiments may refer to a stroke, length, or radian from an initial position of the acceleration controller to an end position of the acceleration controller, and may be directly measured by using a position sensor or an angle sensor. Certainly, in some exemplary embodiments, the operation value may alternatively be detected by using a variable resistor. For example, a resistance value of the variable resistor is changed due to a change in a position of the acceleration controller. In this case, the operation value may be finally obtained based on a one-to-one correspondence.

S1032: Generate the corresponding output signal based on the operation value.

In some exemplary embodiments, the operation value may be an analog value. A linearized simulated acceleration control signal may be obtained by using an analog-to-digital converter, and linearization control for changing the driving speed is thus performed to improve user experience and achieve smoother acceleration experience.

Figure 3:
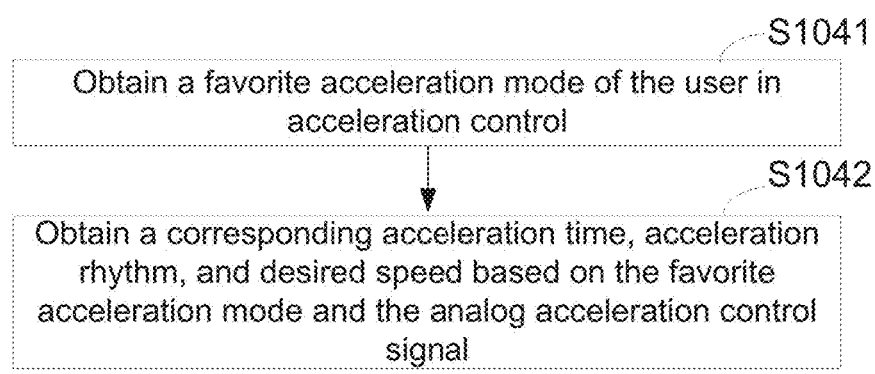
FIG. 3 is a schematic flowchart of a specific implementation of the step S104 in FIG. 1.

It should be emphasized that different users may prefer different acceleration experiences. For example, some users may prefer acceleration quickly. For details, reference may be made to FIG. 3. FIG. 3 shows exemplary embodiments of the step S104 of controlling the drive apparatus of the driving device based on the simulated acceleration control signal in FIG. 1.

As shown in FIG. 3, the step S104 may include steps S1041 and S1042 to achieve different acceleration experiences.

S1041: Obtain an acceleration preference mode of the user for acceleration control.

It should be particularly noted that, in some exemplary embodiments, the acceleration preference mode of the user may be obtained in different ways, and the obtained acceleration preference mode may be variable acceleration, variable deceleration, uniform speed, or the like.

In some exemplary embodiments, taking a vehicle as an example, the acceleration preference data of a user may be collected by an apparatus of the vehicle to generate and store an acceleration preference mode corresponding to the user. Specifically, the collection method may include the following implementation process:

1. Initialize one or more microcontroller unit (MCU) modules, set a bus frequency of the MCU module, initialize a clock module, set a collection mode of the MCU module to be an input capture mode, set a timing interrupt, and set an output I/O mode of each data port to allow an interrupt.

2. Set a timing period such as 50 milliseconds or 100 milliseconds, perform one interrupt to capture an input to accelerator/brake control action collection information of the user, convert the input into speed information and acceleration information, and then send the speed information and the acceleration information to an upper computer such as a vehicle computer through a serial port.

3. The upper computer compiles serial port receiving software of the upper computer, and processes, through multithreading, the speed information and the acceleration information that are obtained by a transceiver serial port.

4. The upper computer decodes and converts the speed information and the acceleration information, and then stores converted information to obtain the acceleration preference mode corresponding to the user. In addition, the upper computer may send related information to MCU modules with different IDs in an entire vehicle control network through a controller area network (CAN) bus network of the vehicle.

5. When an MCU module that controls a motor and whose ID value is 0x100 in the CAN receives a parameter(s) for controlling the motor, the MCU module decodes the parameter(s) into the corresponding PWM duty cycle, a motor drive module controls the motor to pull the throttle stroke, so as to control the speed of the vehicle in real time. In addition, based on continuously collected speed information and acceleration information of the user, a command may be delivered within a control period to control the accelerator motor and the speed of the vehicle.

It is easy to understand that usual operation data of the user may be collected and processed to personalizedly set an operation habit of the user. Therefore, in the automatic driving mode, simulation can be performed intelligently based on the personalized acceleration preference mode of the user, thereby better improving user experience.

It needs to be supplemented that, in some exemplary embodiments, the collected usual operation data of the user may also be processed through machine learning and training, which may specifically include the following several manners:

manner 1: obtaining the operation data, converting the operation data into data in an internally usable form, and integrating the new operation data with the original operation data;

manner 2: using a decision tree to classify the operation data, where each internal node in the tree corresponds to an operation data attribute, each edge corresponds to an optional value of the attribute, and a leaf node of the tree corresponds to a basic class of the operation data;

manner 3: performing association learning, where the operation data obtained through learning is finally summarized into a neural network; and/or manner 4: determining and optimizing selection of the operation data through tentative interaction with an environment to realize a sequence decision task.

In the present disclosure, in the foregoing manners, a personalized input habit of a driver may be intelligently learned in the manual driving mode through machine learning and training.

S1042: Obtain a corresponding acceleration time, acceleration pace, and desired speed based on the acceleration preference mode and the simulated acceleration control signal.

It is easy to understand that, after the acceleration preference mode of the user is obtained, the acceleration time, the acceleration pace, and the driving speed finally desired by the user may be calculated.

It is worth mentioning that the step S1041 may be implemented in a different manner, for example, may be implemented in one of the following two manners.

In one manner, the obtaining of the acceleration preference mode of the user for acceleration control may include: obtaining the acceleration preference mode manually set by the user.

In the other manner, the obtaining of the acceleration preference mode of the user for acceleration control may include: obtaining driving habit data of the user by using a plurality of sensors, generating a corresponding acceleration preference mode of the user based on the driving habit data, and automatically configuring the generated acceleration preference mode as the acceleration preference mode of the user.

It needs to be supplemented that the step S1032 of generating the corresponding output signal based on the operation value in some exemplary embodiments may be specifically implemented in one of the following two manners.

In one manner, the generating of the corresponding output signal based on the operation value may include: looking up a preset value-acceleration correspondence table to obtain the corresponding simulated acceleration control signal based on the operation value.

In the other manner, the generating of the corresponding output signal based on the operation value may include: calculating the corresponding simulated acceleration control signal in real time based on the operation value.

It is worth mentioning that the step S102 of receiving the output signal of the acceleration controller in real time in some exemplary embodiments may specifically include: receiving, in real time, an output signal of operating, by a user, an electric accelerator pedal, a fuel accelerator pedal, a hybrid accelerator pedal, an electric brake pedal, a fuel brake pedal, or a hybrid brake pedal.

It is easy to understand that the acceleration controller in this implementation may be the electric accelerator pedal, the fuel accelerator pedal, the hybrid accelerator pedal, the electric brake pedal, the fuel brake pedal, or the hybrid brake pedal. In other words, the acceleration controller can realize acceleration, deceleration, and braking to provide better manual driving experience in the automatic driving mode.

It should be supplemented that the step S101 of determining whether the driving device is currently in the automatic driving state in some exemplary embodiments may specifically include: determining whether a vehicle, boat, or manned aircraft is currently being piloted in the automatic driving state.

Figure 4:
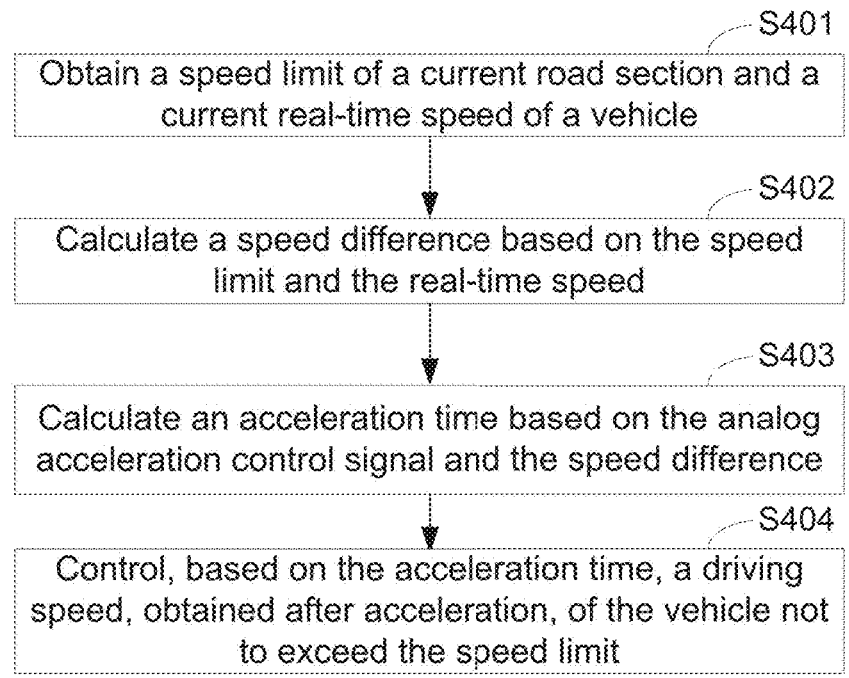
FIG. 4 is a schematic flowchart of a specific implementation of the step S104 in FIG. 1.

FIG. 4 shows some exemplary embodiments of the step S104 shown in FIG. 1. They may include steps S401 to S404.

For example, as shown in FIG. 4, the driving device is a vehicle, and the step S104 of controlling the drive apparatus of the driving device based on the simulated acceleration control signal may further include the following steps.

S401: Obtain a speed limit of a current road section and a current real-time speed of the vehicle.

It is worth noting that the step S401 of obtaining the speed limit of the current road section in some exemplary embodiments may be specifically performed in one of the following several manners:

manner 1: obtaining the current road section of the vehicle through positioning, and obtaining the corresponding speed limit from a local or network road database;

manner 2: obtaining the speed limit of the current road section of the vehicle and the real-time speed of the vehicle by using navigation software (such as a third party navigation software);

manner 3: obtaining the speed limit of the current road section of the vehicle by using a mobile communication device in communication with the vehicle via a network;

manner 4: obtaining the speed limit by using a camera (such as a camera on the vehicle) to photograph a speed limit sign of the current road section.

S402: Calculate a speed difference based on the speed limit and the real-time speed.

For example, if the speed limit is 120 km/h and the real-time speed is 60 km/h, the speed difference is 60 km/h.

S403: Calculate an acceleration time based on the simulated acceleration control signal and the speed difference.

As described above, the speed difference is 60 km/h. If the simulated acceleration control signal is 10 $M/S^2$, a final acceleration time needed may be calculated.

S404: Control, based on the acceleration time, a driving speed of the vehicle after the acceleration not to exceed the speed limit.

After the acceleration time is calculated, any related acceleration action may be stopped after the acceleration time expires to prevent the driving speed from exceed the speed limit to cause speeding.

Figure 5:
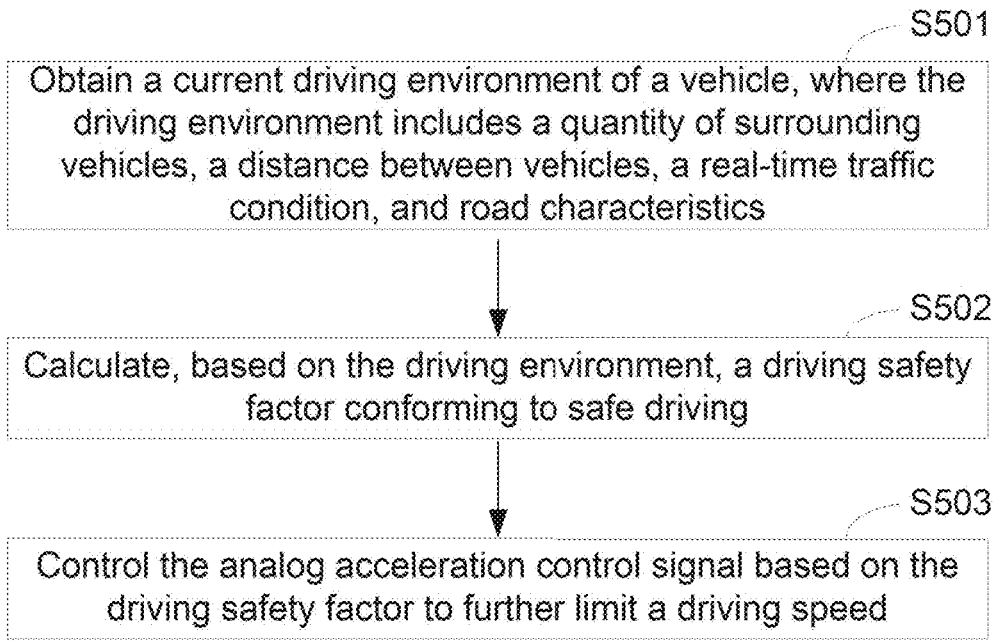
FIG. 5 is a schematic flowchart of a specific implementation of the step S104 in FIG. 1.

FIG. 5 shows some exemplary embodiments of the step S104 shown in FIG. 1. They may include steps S501 to S503.

As shown in FIG. 5, in some exemplary embodiments, the driving device may be a vehicle, and the step S104 of controlling the drive apparatus of the driving device based on the simulated acceleration control signal may further include the following steps.

Step S501: Obtain a current driving environment of the vehicle, where the driving environment includes a quantity of surrounding vehicles, a distance between vehicles, a real-time traffic condition, and road characteristics.

It needs to be described in detail that the driving environment in some exemplary embodiments may be the quantity (large/small) of surrounding vehicles, the distance (short/long) between vehicles, the real-time traffic condition (smooth/congested), the road characteristics (wide/narrow/slope/dry/wet and slippery/curved/straight), and the like.

Step S502: Calculate, based on the driving environment, a driving safety factor conforming to safe driving.

Correspondingly, the calculating, based on the driving environment, of the driving safety factor conforming to safe driving in some exemplary embodiments may include: calculating, based on the quantity (large/small) of surrounding vehicles, the distance (short/long) between vehicles, the real-time traffic condition (smooth/congested), and the road characteristics (wide/narrow/slope/dry/slippery/curved/straight), the driving safety factor conforming to safe driving.

Step S503: Control the simulated acceleration control signal based on the driving safety factor to further limit the driving speed.

Figure 6:
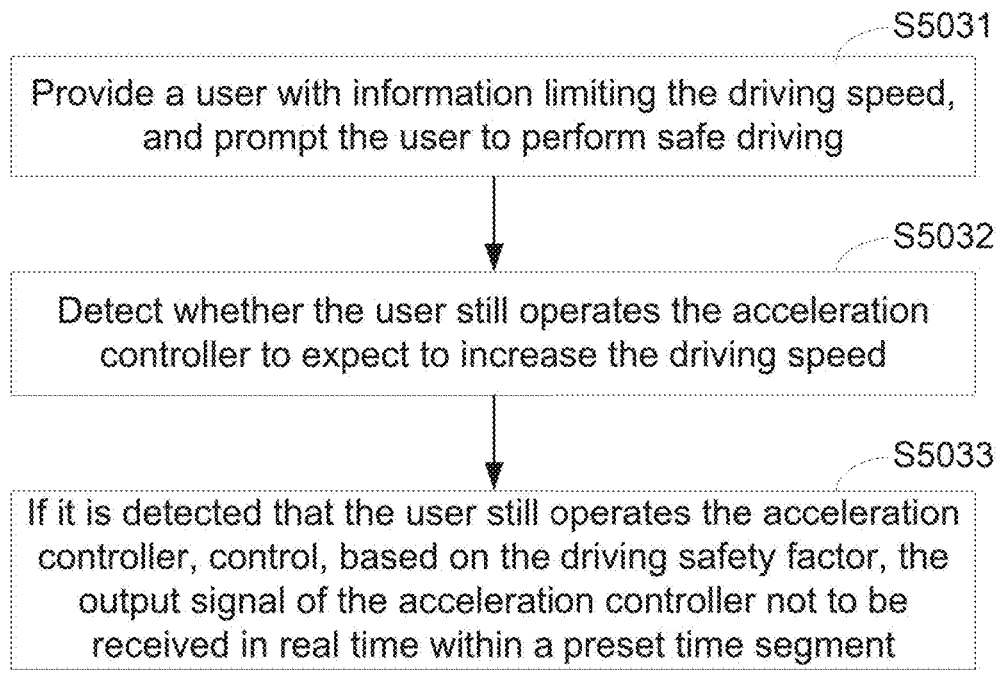
FIG. 6 is a schematic flowchart of a specific implementation of the step S503 in FIG. 5.

It should be particularly noted that, as shown in FIG. 6, after the step S503 of controlling the simulated acceleration control signal based on the driving safety factor to limit the driving speed in some exemplary embodiments, the method may further include the following steps.

S5031: Provide the user with information of limiting the driving speed, and prompt the user to perform safe driving.

It is not difficult to understand that, in some exemplary embodiments, for a normal driving operation or an abnormal operation, for example, drivers are in abnormal situations, such as drunk, taking drugs, and the like, a prompt may be provided to avoid the operation.

S5032: Detect whether the user still operates the acceleration controller to expect to increase the driving speed.

It is easy to understand that a normal user generally does not perform an abnormal unsafe operation such as speeding. Therefore, in some exemplary embodiments, the user's intention needs to be determined.

S5033: If it is detected that the user still operates the acceleration controller, control, based on the driving safety factor, not to receive an output signal of the acceleration controller in real time within a preset time period.

Finally, in some exemplary embodiments, users and their operations and behaviors may be monitored. This may avoid abnormal acceleration operations of the users, and may also stop an operation of acceleration, so as to reduce energy consumption of the system.

Figure 7:
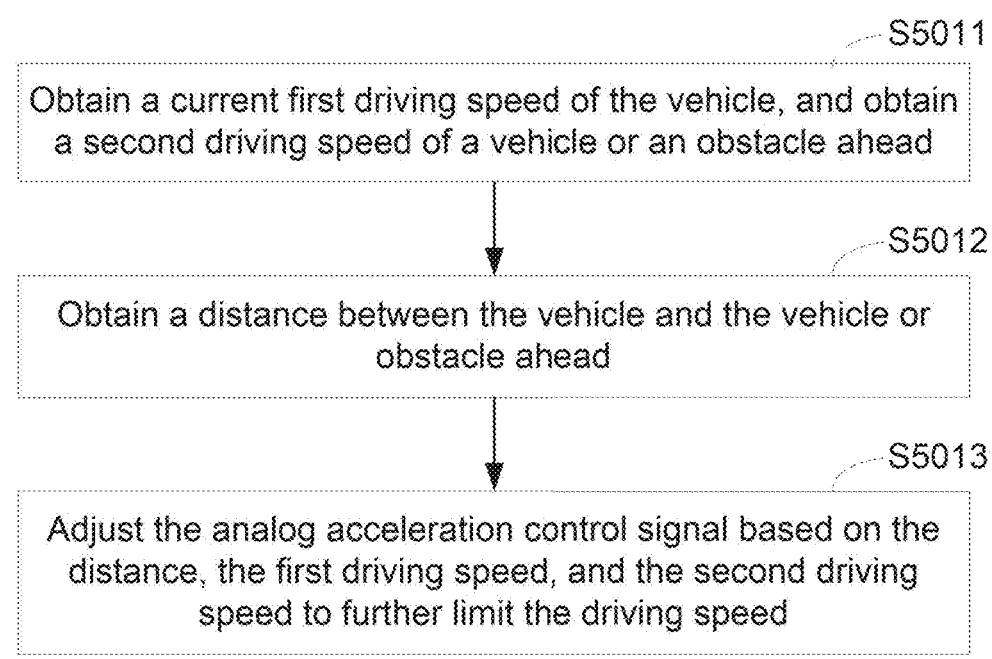
FIG. 7 is a schematic flowchart of a specific implementation of the step S501 in FIG. 5.

FIG. 7 is a schematic flowchart of another embodiment of the step S501 in FIG. 5. As shown in FIG. 7, the obtaining of the current driving environment of the vehicle in some exemplary embodiments may further include steps S5011 to S5013.

S5011: Obtain a current first driving speed of the vehicle, and obtain a second driving speed of a vehicle or an obstacle in front.

It is easy to understand that, when a vehicle is running, if the state of a vehicle or obstacle in front cannot bet found in time, a rear-end collision may occur. In such a case, it is necessary to monitor the front and control the speed of the vehicle.

S5012: Obtain a distance between the vehicle and the vehicle or obstacle ahead.

Correspondingly, after the speeds of the vehicle and the vehicle or obstacle in front are obtained, the distance between the vehicle and the vehicle or obstacle in front further needs to be determined, in order to effectively and accurately control the speed. In some exemplary embodiments, the distance may be measured by a radar or laser, or may be calculated based on satellite positioning results of the vehicle and the vehicle or obstacle ahead.

S5013: Adjust the simulated acceleration control signal based on the distance, the first driving speed, and the second driving speed to further limit the driving speed.

In addition, in some exemplary embodiments, the step S5013 of adjusting the simulated acceleration control signal based on the distance, the first driving speed, and the second driving speed to further limit the driving speed may include: determining whether the distance is less than a preset safety threshold; and adjusting the simulated acceleration control signal to a negative value if the distance is less than the preset safety threshold, to decrease the driving speed.

Further, in some exemplary embodiments, the adjusting of the the simulated acceleration control signal to a negative value to decrease the driving speed may include: adjusting the simulated acceleration control signal to the negative value to control the driving speed to be equal to the second driving speed, less than the second driving speed, or equal to zero so that the vehicle stops.

It is easy to understand that, in some exemplary embodiments, a desired driving speed may be calculated based on a calculation formula of the acceleration/first and second driving speeds/distance.

According to the present disclosure, an operation on the acceleration controller may still be used as an acceleration/deceleration operation in the automatic driving state. This may maintain a user's operation habit and operation experience in different driving modes, avoid the user's illusion of "out of control", and improve user experience, as well as market competitiveness of products.

Figure 8:
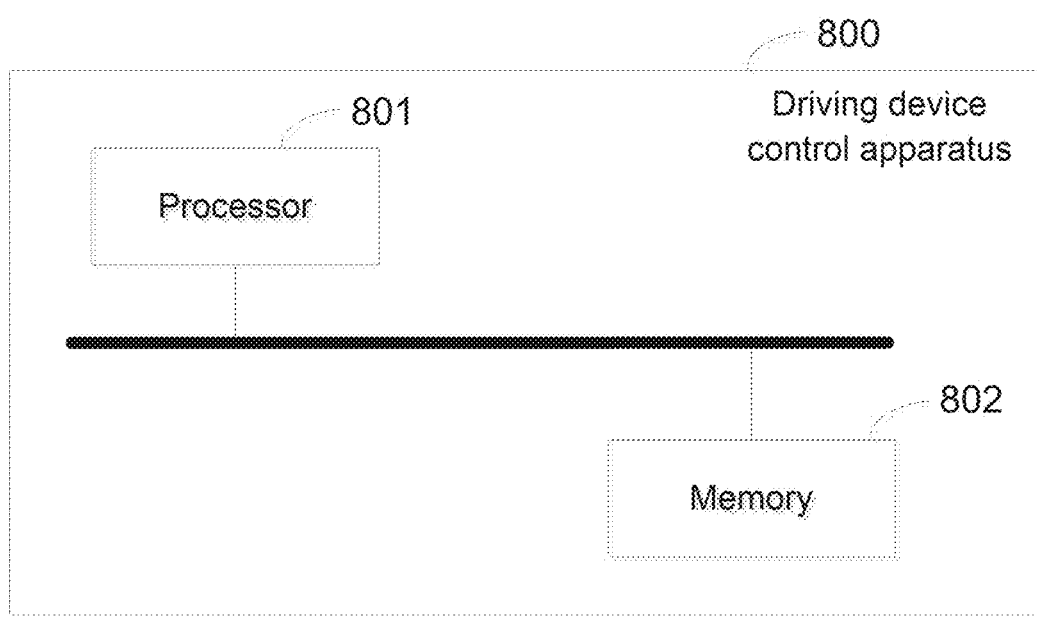
FIG. 8 is a schematic block diagram of a driving device control apparatus according to some exemplary embodiments of the present disclosure.

Referring to FIG. 8 with further reference to FIG. 1 to FIG. 7 and the corresponding embodiments, FIG. 8 is a schematic block diagram of a driving device control apparatus according to some exemplary embodiments of the present disclosure, which may be used to implement the control method described above. The control apparatus 800 may include at least one storage medium (such as at least one memory 802) and at least one processor 801. The processor 801 and the memory 802 are in communication via a bus 803, for example, an inter-integrated circuit (I2C) bus.

Specifically, the processor 801 may be an MCU, a central processing unit (CPU), a digital signal processor (DSP), or the like.

Specifically, the memory 802 may be a flash chip, a read-only memory (ROM), a disk, an optical disk, a USB flash drive, or a mobile hard disk.

In some exemplary embodiments, the memory 802 may be configured to store a computer program and/or a set of instructions for the above-mentioned method and/or the following steps. The processor 801 may be configured to execute the computer program and/or the set of instructions during operation to perform the above-mentioned method and/or the following steps:

determining whether a driving device is currently in an automatic driving state;

if the driving device is in the automatic driving state, receiving an output signal of an acceleration controller in real time;

generating a simulated acceleration control signal based on the output signal of the acceleration controller; and controlling a drive apparatus of the driving device based on the simulated acceleration control signal.

In some exemplary embodiments, when receiving the output signal of the acceleration controller in real time, the processor 801 may be configured to perform the following steps:

obtaining an operation value of operating the acceleration controller by a user; and generating the corresponding output signal based on the operation value.

In some exemplary embodiments, when controlling the drive apparatus of the driving device based on the simulated acceleration control signal, the processor 801 may be configured to perform the following steps:

obtaining an acceleration preference mode of the user in acceleration control; and obtaining a corresponding acceleration time, acceleration pace, and a desired speed based on the acceleration preference mode and the simulated acceleration control signal.

In some exemplary embodiments, when obtaining the acceleration preference mode of the user in acceleration control, the processor 801 may be configured to perform the following step:

obtaining the acceleration preference mode manually set by the user; or obtaining driving habit data of the user by using a plurality of sensors, generating a corresponding acceleration preference mode of the user based on the driving habit data, and automatically configuring the generated acceleration preference mode as the acceleration preference mode of the user.

In some exemplary embodiments, when generating the corresponding output signal based on the operation value, the processor 801 may be configured to perform the following step:

looking up a preset value-acceleration correspondence table to obtain the corresponding simulated acceleration control signal based on the operation value; or calculating the corresponding simulated acceleration control signal in real time based on the operation value.

In some exemplary embodiments, when receiving the output signal of the acceleration controller in real time, the processor 801 may be configured to perform the following step:

receiving, in real time, an output signal of operating an electric accelerator pedal, a fuel accelerator pedal, a hybrid accelerator pedal, an electric brake pedal, a fuel brake pedal, or a hybrid brake pedal by the user.

In some exemplary embodiments, when determining whether the driving device is currently in the automatic driving state, the processor 801 may be configured to perform the following step:

determining whether a vehicle, boat, or manned aircraft is currently being piloted in the automatic driving state.

In some exemplary embodiments, the driving device may be a vehicle, and when controlling the drive apparatus of the driving device based on the simulated acceleration control signal, the processor 801 may be further configured to perform the following steps:

obtaining a speed limit of a current road section and a current real-time speed of the vehicle;

calculating a speed difference based on the speed limit and the real-time speed;

calculating an acceleration time based on the simulated acceleration control signal and the speed difference; and controlling, based on the acceleration time, a driving speed of the vehicle resulted from acceleration not to exceed the speed limit.

In some exemplary embodiments, when obtaining the speed limit of the current road section, the processor 801 may be configured to perform the following step:

identifying the current road section of the vehicle through positioning, and obtaining the corresponding speed limit from a local or network road database; or obtaining the speed limit of the current road section of the vehicle and the real-time speed of the vehicle by using navigation software (such as third party navigation software); or obtaining the speed limit of the current road section of the vehicle by using a mobile communication device in communication with the vehicle via a network; or obtaining the speed limit by using a camera of the vehicle to photograph a speed limit sign of the current road section.

In some exemplary embodiments, the driving device may be a vehicle, and when controlling the drive apparatus of the driving device based on the simulated acceleration control signal, the processor 801 may be further configured to perform the following steps:

obtaining a current driving environment of the vehicle, where the driving environment may include a quantity of surrounding vehicles, a distance between vehicles, a real-time traffic condition, and road characteristics;

calculating, based on the driving environment, a driving safety factor conforming to safe driving; and controlling the simulated acceleration control signal based on the driving safety factor to further limit a driving speed.

In some exemplary embodiments, when calculating, based on the driving environment, the driving safety factor conforming to safe driving, the processor 801 may be configured to perform the following step:

calculating the driving safety factor conforming to safe driving based on the quantity (large/small) of surrounding vehicles, the distance (short/long) between vehicles, the real-time traffic condition (smooth/congested), and the road characteristics (wide/narrow/slope/dry/slippery/curved/straight).

In some exemplary embodiments, after controlling the simulated acceleration control signal based on the driving safety factor to further limit the driving speed, the processor 801 may be further configured to perform the following steps:

providing the user with information of limiting the driving speed, and prompting the user to perform safe driving;

detecting whether the user still operates the acceleration controller to expect to increase the driving speed; and if it is detected that the user still operates the acceleration controller, controlling, based on the driving safety factor, not to receive the output signal of the acceleration controller in real time within a preset time period.

In some exemplary embodiments, when obtaining the current driving environment of the vehicle, the processor 801 may be further configured to perform the following steps:

obtaining a current first driving speed of the vehicle, and obtaining a second driving speed of a vehicle or an obstacle in front;

obtaining a distance between the vehicle and the vehicle or obstacle in front; and adjusting the simulated acceleration control signal based on the distance, the first driving speed, and the second driving speed to further limit the driving speed.

In some exemplary embodiments, when adjusting the simulated acceleration control signal based on the distance, the first driving speed, and the second driving speed to further limit the driving speed, the processor 801 may be configured to perform the following steps:

determining whether the distance is less than a preset safety threshold; and adjusting the simulated acceleration control signal to a negative value if the distance is less than the preset safety threshold, so as to decrease the driving speed.

In some exemplary embodiments, when adjusting the simulated acceleration control signal to the negative value if the distance is less than the preset safety threshold, to decrease the driving speed, the processor 801 may be configured to perform the following step:

adjusting the simulated acceleration control signal to the negative value to control the driving speed to be equal to the second driving speed, less than the second driving speed, or equal to zero so that the vehicle stops.

Some exemplary embodiments further provide a storage medium, in particular a non-transitory storage medium. The storage medium may be a computer-readable storage medium, for example, a hard disk or an internal memory, or may be an external storage device connected to a driving device, for example, an equipped plug-in hard disk, a smart media card (SMC), a secure digital (SD) card, or a flash card.

In some exemplary embodiments, the storage medium may store a computer program. The computer program may be executed by a processor to perform the following steps:

determining whether a driving device is currently in an automatic driving state;

if the driving device is in the automatic driving state, receiving an output signal of an acceleration controller in real time;

generating a simulated acceleration control signal based on the output signal of the acceleration controller; and controlling a drive apparatus of the driving device based on the simulated acceleration control signal.

In some exemplary embodiments, when receiving the output signal of the acceleration controller in real time, the processor may be configured to perform the following steps:

obtaining an operation value of operating the acceleration controller by a user; and generating the corresponding output signal based on the operation value.

In some exemplary embodiments, when controlling the drive apparatus of the driving device based on the simulated acceleration control signal, the processor may be configured to perform the following steps:

obtaining an acceleration preference mode of the user in acceleration control; and obtaining a corresponding acceleration time, acceleration pace, and a desired speed based on the acceleration preference mode and the simulated acceleration control signal.

In some exemplary embodiments, when obtaining the acceleration preference mode of the user in acceleration control, the processor may be configured to perform the following step:

obtaining the acceleration preference mode manually set by the user; or obtaining driving habit data of the user by using a plurality of sensors, generating a corresponding acceleration preference mode of the user based on the driving habit data, and automatically configuring the generated acceleration preference mode as the acceleration preference mode of the user.

In some exemplary embodiments, when generating the corresponding output signal based on the operation value, the processor may be configured to perform the following step:

looking up a preset value-acceleration correspondence table to obtain the corresponding simulated acceleration control signal based on the operation value; or calculating the corresponding simulated acceleration control signal in real time based on the operation value.

In some exemplary embodiments, when receiving the output signal of the acceleration controller in real time, the processor may be configured to perform the following step:

receiving, in real time, an output signal of operating an electric accelerator pedal, a fuel accelerator pedal, a hybrid accelerator pedal, an electric brake pedal, a fuel brake pedal, or a hybrid brake pedal by the user.

In some exemplary embodiments, when determining whether the driving device is currently in the automatic driving state, the processor may be configured to perform the following step:

determining whether a vehicle, boat, or manned aircraft is currently being piloted in the automatic driving state.

In some exemplary embodiments, the driving device may be a vehicle, and when controlling the drive apparatus of the driving device based on the simulated acceleration control signal, the processor may be further configured to perform the following steps:

obtaining a speed limit of a current road section and a current real-time speed of the vehicle;

calculating a speed difference based on the speed limit and the real-time speed;

calculating an acceleration time based on the simulated acceleration control signal and the speed difference; and controlling, based on the acceleration time, a driving speed of the vehicle resulted from acceleration not to exceed the speed limit.

In some exemplary embodiments, when obtaining the speed limit of the current road section, the processor may be configured to perform the following step:

identifying the current road section of the vehicle through positioning, and obtaining the corresponding speed limit from a local or network road database; or obtaining the speed limit of the current road section of the vehicle and the real-time speed of the vehicle by using navigation software (such as third party navigation software); or obtaining the speed limit of the current road section of the vehicle by using a mobile communication device in communication with the vehicle via a network; or obtaining the speed limit by using a camera of the vehicle to photograph a speed limit sign of the current road section.

In some exemplary embodiments, the driving device may be a vehicle, and when controlling the drive apparatus of the driving device based on the simulated acceleration control signal, the processor may be further configured to perform the following steps:

obtaining a current driving environment of the vehicle, where the driving environment may include a quantity of surrounding vehicles, a distance between vehicles, a real-time traffic condition, and road characteristics;

calculating, based on the driving environment, a driving safety factor conforming to safe driving; and controlling the simulated acceleration control signal based on the driving safety factor to further limit a driving speed.

In some exemplary embodiments, when calculating, based on the driving environment, the driving safety factor conforming to safe driving, the processor may be configured to perform the following step:

calculating the driving safety factor conforming to safe driving based on the quantity (large/small) of surrounding vehicles, the distance (short/long) between vehicles, the real-time traffic condition (smooth/congested), and the road characteristics (wide/narrow/slope/dry/slippery/curved/straight).

In some exemplary embodiments, after controlling the simulated acceleration control signal based on the driving safety factor to further limit the driving speed, the processor may be further configured to perform the following steps:

providing the user with information of limiting the driving speed, and prompting the user to perform safe driving;

detecting whether the user still operates the acceleration controller to expect to increase the driving speed; and if it is detected that the user still operates the acceleration controller, controlling, based on the driving safety factor, not to receive the output signal of the acceleration controller in real time within a preset time period.

In some exemplary embodiments, when obtaining the current driving environment of the vehicle, the processor may be further configured to perform the following steps:

obtaining a current first driving speed of the vehicle, and obtaining a second driving speed of a vehicle or an obstacle in front;

obtaining a distance between the vehicle and the vehicle or obstacle in front; and adjusting the simulated acceleration control signal based on the distance, the first driving speed, and the second driving speed to further limit the driving speed.

In some exemplary embodiments, when adjusting the simulated acceleration control signal based on the distance, the first driving speed, and the second driving speed to further limit the driving speed, the processor may be configured to perform the following steps:

determining whether the distance is less than a preset safety threshold; and adjusting the simulated acceleration control signal to a negative value if the distance is less than the preset safety threshold, so as to decrease the driving speed.

In some exemplary embodiments, when adjusting the simulated acceleration control signal to the negative value if the distance is less than the preset safety threshold, to decrease the driving speed, the processor may be configured to perform the following step:

adjusting the simulated acceleration control signal to the negative value, to control the driving speed to be equal to the second driving speed, less than the second driving speed, or equal to zero so that the vehicle stops.

For a specific implementation process, reference may be made to FIG. 1 to FIG. 7 and related descriptions in the specific exemplary embodiments corresponding to FIG. 1 to FIG. 7. Details will not be repeated within the scope that can be easily understood by a person skilled in the art.

Refer to FIG. 8. Some exemplary embodiments further provide a driving device. In some exemplary embodiments, the driving device may include at least one memory 802 and at least one processor 801 in communication with the memory 802.

The memory 802 may be configured to store a computer program.

The processor 801 may be configured to execute the computer program to perform the following steps:

determining whether the driving device is currently in an automatic driving state;

if the driving device is in the automatic driving state, receiving an output signal of an acceleration controller in real time;

generating a simulated acceleration control signal based on the output signal of the acceleration controller; and controlling a drive apparatus of the driving device based on the simulated acceleration control signal.

In some exemplary embodiments, when receiving the output signal of the acceleration controller in real time, the processor 801 may be configured to perform the following steps:

obtaining an operation value of operating the acceleration controller by a user; and generating the corresponding output signal based on the operation value.

In some exemplary embodiments, when controlling the drive apparatus of the driving device based on the simulated acceleration control signal, the processor 801 may be configured to perform the following steps:

obtaining an acceleration preference mode of the user in acceleration control; and obtaining a corresponding acceleration time, acceleration pace, and a desired speed based on the acceleration preference mode and the simulated acceleration control signal.

In some exemplary embodiments, when obtaining the acceleration preference mode of the user in acceleration control, the processor 801 may be configured to perform the following step:

obtaining the acceleration preference mode manually set by the user; or obtaining driving habit data of the user by using a plurality of sensors, generating a corresponding acceleration preference mode of the user based on the driving habit data, and automatically configuring the generated acceleration preference mode as the acceleration preference mode of the user.

In some exemplary embodiments, when generating the corresponding output signal based on the operation value, the processor 801 may be configured to perform the following step:

looking up a preset value-acceleration correspondence table to obtain the corresponding simulated acceleration control signal based on the operation value; or calculating the corresponding simulated acceleration control signal in real time based on the operation value.

In some exemplary embodiments, the acceleration controller is an electric accelerator pedal, a fuel accelerator pedal, a hybrid accelerator pedal, an electric brake pedal, a fuel brake pedal, or a hybrid brake pedal.

In some exemplary embodiments, the driving device may be a vehicle, a boat, or a manned aircraft.

In some exemplary embodiments, the driving device may be a vehicle, and when controlling the drive apparatus of the driving device based on the simulated acceleration control signal, the processor 801 may be further configured to perform the following steps:

obtaining a speed limit of a current road section and a current real-time speed of the vehicle;

calculating a speed difference based on the speed limit and the real-time speed;

calculating an acceleration time based on the simulated acceleration control signal and the speed difference; and controlling, based on the acceleration time, a driving speed of the vehicle resulted from acceleration not to exceed the speed limit.

In some exemplary embodiments, when obtaining the speed limit of the current road section, the processor 801 may be configured to perform the following step:

obtaining the current road section of the vehicle through positioning, and obtaining the corresponding speed limit from a local or network-side road database; or obtaining the speed limit of the current road section of the vehicle and the real-time speed of the vehicle by using navigation software (such as third party navigation software); or obtaining the speed limit of the current road section of the vehicle by using a mobile communication device in communication with the vehicle via a network; or obtaining the speed limit by using a camera of the vehicle to photograph a speed limit sign of the current road section.

In some exemplary embodiments, the driving device may be a vehicle, and when controlling the drive apparatus of the driving device based on the simulated acceleration control signal, the processor 801 may be further configured to perform the following steps:

obtaining a current driving environment of the vehicle, where the driving environment may include a quantity of surrounding vehicles, a distance between vehicles, a real-time traffic condition, and road characteristics;

calculating, based on the driving environment, a driving safety factor conforming to safe driving; and controlling the simulated acceleration control signal based on the driving safety factor to further limit a driving speed.

In some exemplary embodiments, when calculating, based on the driving environment, the driving safety factor conforming to safe driving, the processor 801 may be configured to perform the following step:

calculating the driving safety factor conforming to safe driving based on the quantity (large/small) of surrounding vehicles, the distance (short/long) between vehicles, the real-time traffic condition (smooth/congested), and the road characteristics (wide/narrow/slope/dry/slippery/curved/straight).

In some exemplary embodiments, after controlling the simulated acceleration control signal based on the driving safety factor to further limit the driving speed, the processor 801 may be further configured to perform the following steps:

providing the user with information of limiting the driving speed, and prompting the user to perform safe driving;

detecting whether the user still operates the acceleration controller to expect to increase the driving speed; and if it is detected that the user still operates the acceleration controller, controlling, based on the driving safety factor, not to receive the output signal of the acceleration controller in real time within a preset time period.

In some exemplary embodiments, when obtaining the current driving environment of the vehicle, the processor 801 may be further configured to perform the following steps:

obtaining a current first driving speed of the vehicle, and obtaining a second driving speed of a vehicle or an obstacle in front;

obtaining a distance between the vehicle and the vehicle or obstacle in front; and adjusting the simulated acceleration control signal based on the distance, the first driving speed, and the second driving speed to further limit the driving speed.

In some exemplary embodiments, when adjusting the simulated acceleration control signal based on the distance, the first driving speed, and the second driving speed to further limit the driving speed, the processor 801 may be configured to perform the following steps:

determining whether the distance is less than a preset safety threshold; and adjusting the simulated acceleration control signal to a negative value if the distance is less than the preset safety threshold, so as to decrease the driving speed.

In some exemplary embodiments, when adjusting the simulated acceleration control signal to the negative value if the distance is less than the preset safety threshold, to decrease the driving speed, the processor 801 may be configured to perform the following step:

adjusting the simulated acceleration control signal to the negative value, to control the driving speed to be equal to the second driving speed, less than the second driving speed, or equal to zero so that the vehicle stops.

Figure 9:
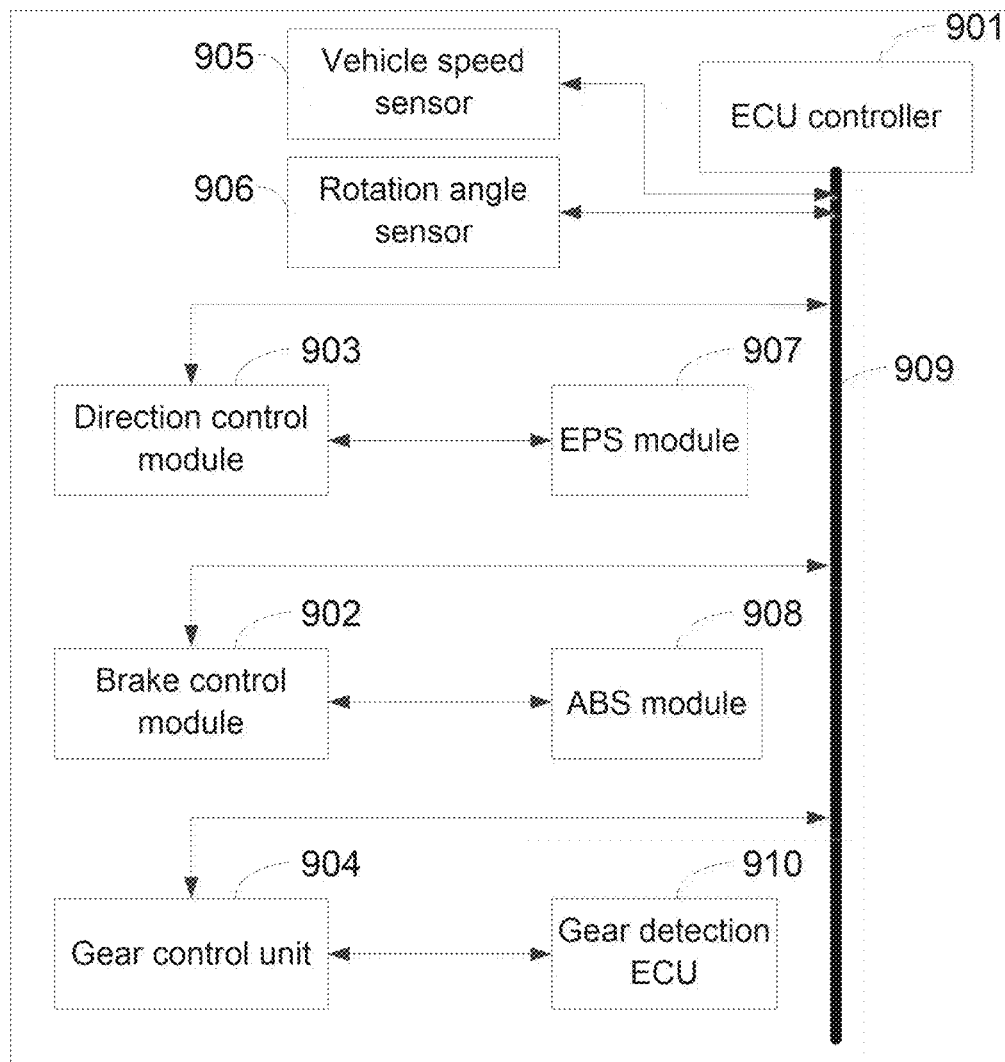
FIG. 9 is a schematic block diagram of a driving device according to some exemplary embodiments of the present disclosure.

In the present disclosure, as shown in FIG. 9, an example in which the driving device is an unmanned vehicle is used in some exemplary embodiments for detailed description.

Specifically, the unmanned vehicle may include an electronic control unit (ECU) controller 901, a brake control module 902, a direction control module 903, a gear control unit 904, a vehicle speed sensor 905, and a rotation angle sensor 906 that are connected to each other. The brake control module 902 or the gear control unit 904 may be connected to the acceleration controller, and the acceleration controller may specifically be an accelerator pedal structure or a brake pedal structure.

In the present disclosure, the module and unit may refer to a tangible mechanical and/or electrical structure designed for a specific function. In some exemplary embodiments, the module and unit may also refer to one or more computer-executable programs or one or more set of instructions stored in a storage medium configured to instruct one or more processor to execute the specific function.

In some exemplary embodiments, the ECU controller 901 may be an ECU, that is, a driving computer, an on-board computer, or the like. The ECU controller 901 may be a vehicle-specific microcontroller. By using a CAN bus 909, the ECU controller 901 may receive a real-time speed sent by the vehicle speed sensor 905, an angle sent by the rotation angle sensor 906, and an angular speed sent by the direction control module 903, and output interactive information, fault information, or the like.

It should be noted that the ECU controller 901 in some exemplary embodiments may be separately connected to the brake control module 902, the direction control module 903, and the gear control unit 904 via the CAN bus 909.

In addition, the direction control module 903 may be connected to an electronic power steering (EPS) module 907 of the unmanned vehicle via the CAN bus 909. The brake control module 902 may be connected to an anti-lock brake system (ABS) module 908 of the unmanned vehicle via the CAN bus. In addition, the gear control unit 904 may also be connected to a gear detection ECU 910 via the CAN bus.

It is easy to understand that the unmanned vehicle in some exemplary embodiments may further include a human-computer interaction unit (not shown) and a power supply unit (not shown). The human-computer interaction unit may include a button(s) and a display. The button(s) may be used by a user to enable or disable a vehicle system. The display may be configured to display information for interaction, for example, configured to display fault information of the vehicle system. The power supply unit may be configured to supply power to the ECU controller 901.

It is worth mentioning that the display in some exemplary embodiments may be a touch screen, for example, a capacitive touch screen. In addition, there may be one or more CAN buses 909. For example, there may be a CAN bus 1, a CAN bus 2, and a CAN bus 3.

It should be noted that, in some exemplary embodiments, driving costs of the unmanned vehicle may further be accurately controlled by using a control method, for example, by using the following setting and control method.

At least one position sensor may be disposed to detect the operation value of the acceleration controller. The position sensor may be connected to the ECU controller 901 via the CAN bus 909. When a user operates the acceleration controller in an automatic driving state, the position sensor may detect whether the operation value of the acceleration controller matches a real-time speed. If the operation value of the acceleration controller does not match the real-time speed, it may be determined that the operation of the user is "excessive", which may cause a waste of energy. In this case, a reminder may be provided to the user and the operation value may be adjusted into a proper range, so as to perform an energy-saving driving operation.

Figure 10:
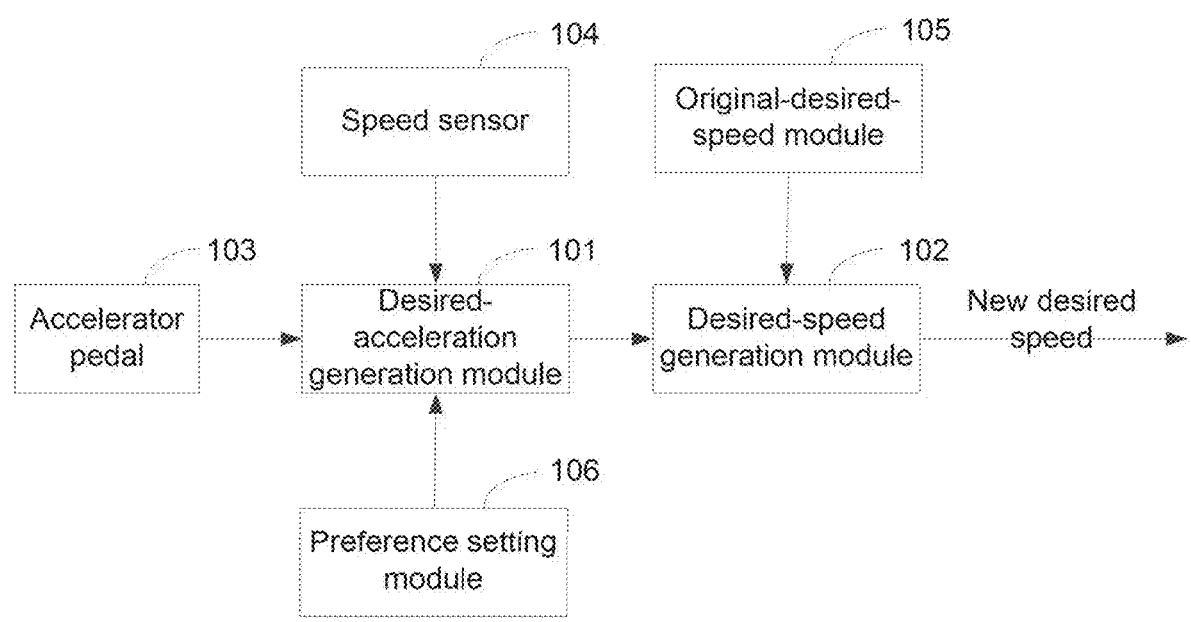
FIG. 10 is a schematic diagram of a hardware implementation of a driving device according to some exemplary embodiments of the present disclosure.

Referring to FIG. 10 with further reference to the foregoing one or more exemplary embodiments, FIG. 10 is a schematic diagram of a hardware implementation of a driving device according to some exemplary embodiments of the present disclosure.

As shown in FIG. 10, the driving device in some exemplary embodiments may include a desired-acceleration generation module 101, a desired-speed generation module 102, an accelerator pedal 103, a speed sensor 104, an original-desired-speed module 105, a preference setting module 106, and the like.

Taking a vehicle as an example, the specific implementation process would be as follows:

1. In an automatic driving state, a driver depresses the accelerator pedal 103.

2. The desired-acceleration generation module 101 may generate a desired acceleration (that is, a simulated acceleration control signal) of the vehicle based on a depression depth (that is, an operation value) of the accelerator pedal 103, a vehicle speed obtained from the speed sensor 104, and a user preference setting (that is, an acceleration preference mode) obtained from the preference setting module 106.

3. The desired-speed generation module 102 may calculate a new desired speed (that is, a driving speed) based on the desired acceleration and a speed instruction of an original desired speed obtained from the original-desired-speed module 105 to control the acceleration of the vehicle.

It is worth noting that the accelerator pedal 103 in some exemplary embodiments may obtain the speed instruction of the original desired speed directly from the desired-speed generation module 102.

In addition, the acceleration generation module 101 in some exemplary embodiments may directly obtain the desired acceleration without referring to a current feedback of the speed sensor 104.

As described above, according to the present disclosure, an operation on an acceleration controller can still be used as an acceleration/deceleration operation in the automatic driving state. This may maintain a user's operation habit and operation experience in different driving modes, avoid the user's illusion of "out of control", and improve user experience, as well as market competitiveness of products.

In addition, with the rapid development of clean energy, and since petroleum resources are non-renewable resources, the unmanned vehicle in some exemplary embodiments may be a hybrid vehicle. Specifically, the hybrid vehicle in some exemplary embodiments may include an internal combustion engine, an electric motor, an accumulator, a driving mode selector, an automatic cruise selector, a vehicle processor, and the like.

In some exemplary embodiments, a method for vehicle control including acceleration control and mode switching over a hybrid vehicle may be as follows: An internal combustion engine is configured to output power for driving. An electric motor is configured to output power for driving. An accumulator is configured to transfer power to the electric motor and receive power from the electric motor. The desired-acceleration generation module 101 is configured to obtain the operation value of a user for the accelerator pedal 103. The driving mode selector is configured to select a manual driving mode or an automatic driving mode as a driving mode. The manual driving mode is used for regular driving. Compared with a power output response to an operation performed by the user on the accelerator pedal 103 in the manual driving mode, a better power output response may be made in the automatic driving mode. The automatic cruise selector is configured to send an instruction for performing a predetermined automatic cruise function. The desired-speed generation module 102 is configured to: without an instruction for performing the predetermined automatic cruise function, set a driving force requirement based on the obtained operation value of the user for the accelerator pedal 103 and a driving force limit corresponding to the manual driving mode or the automatic driving mode; or with an instruction for performing the predetermined automatic cruise function, set, as a driving force requirement, the larger one between a first provisional driving force requirement based on a driving parameter related to predetermined automatic cruise and a second provisional driving force requirement based on the operation value of the user for the accelerator pedal 103 and a driving force limit corresponding to the manual driving mode. A processor of the vehicle is configured to control the internal combustion engine and the electric motor to output power satisfying the set driving force requirement.

Figure 11:
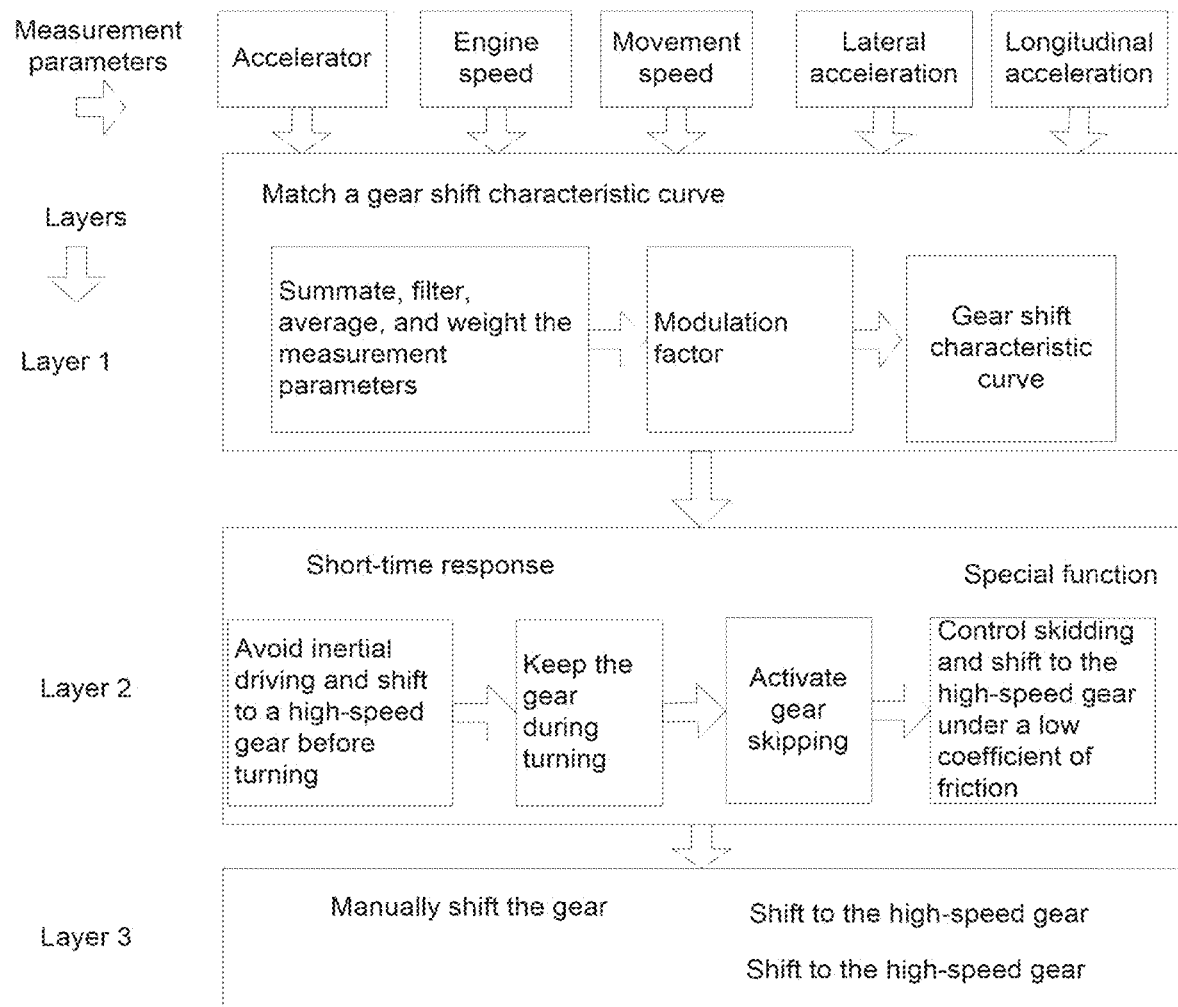
FIG. 11 is a schematic diagram of a gear shift strategy of a traditional mobile platform.

A gear shift strategy of a traditional mobile platform is as shown in FIG. 11. The gear shift strategy may include the following three layers: measurement parameters are collected, where the measurement parameters include at least a moving speed of the mobile platform, an engine speed, an accelerator parameter, and other parameters. At a first layer, a gear shift mode matches a gear shift characteristic curve. To be specific, the measurement parameters are analyzed and processed to obtain processed parameters; the analyzing and processing include summation, filtering, averaging, weighting, and the like. Then, the processed parameters are used to match the gear shift characteristic curve. At a second layer, a short-time transient response is made based on the measurement parameters. At a third layer, manual acceleration or deceleration responds based on an engine speed limit. It can be seen that both the engine speed of the mobile platform and the moving speed of the mobile platform may match a gear position of the mobile platform. To be specific, if the moving speed of the mobile platform decreases, the gear of the mobile platform is shifted down; if the moving speed of the platform increases, the gear of the mobile platform is shifted up. The traditional gear shift strategy has a poor control effect. For example, the mobile platform is usually in a high-speed and high-gear state when the mobile platform is driving on an uphill road, resulting in insufficient power for the mobile platform. Therefore, the gear of the mobile platform needs to be shifted down to increase the power for the uphill road. According to the traditional gear shift strategy, the gear of the mobile platform may be shifted down only after the moving speed of the mobile platform is reduced, resulting in low control efficiency, and causing low traction provided for the mobile platform.

Figure 12:
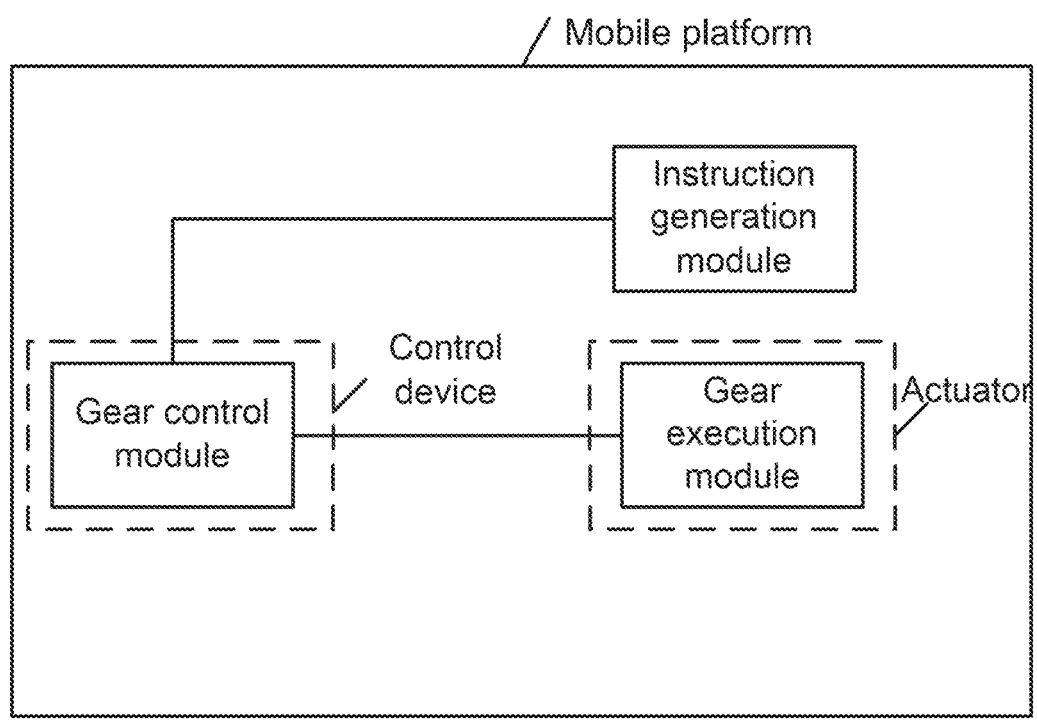
FIG. 12 is a schematic block diagram of a gear control module according to some exemplary embodiments of the present disclosure.

In view of the problem of the traditional gear shift strategy, in some exemplary embodiments of the present disclosure, a gear control module may be added between an instruction generation module and a gear execution module. For a connection relationship between these modules, reference may be made to FIG. 12. In this way, gear control is separated from the moving speed of the mobile platform, so that the mobile platform is allowed to be in a proper gear position, and a control effect of the mobile platform is improved. Specifically, in the present disclosure, a control device may obtain a target gear parameter of the mobile platform, generate a simulated signal (namely, an adjusted operation instruction) based on the target gear parameter, and control the gear of the mobile platform based on the simulated signal, so that the gear of the mobile platform is maintained in a most efficient range. In addition, the gear of the mobile platform may be directly shifted without waiting for a reduction or increase in the moving speed of the mobile platform, thereby improving the control efficiency.

For example, it is assumed that a current moving speed of the mobile platform is 50 km/h. If the control device determines, based on sensor data, that the mobile platform is currently on an uphill road, the sensor data may be obtained, where the sensor data may include driving environment information. For example, the driving environment information may include slope information. The slope information may be obtained by a video sensor or an inertial measurement unit (I M U). The slope information may include an angle, a length, and the like of an uphill road. Further, the control device may determine a target gear of the mobile platform based on the current moving speed of the mobile platform and the slope information. For example, the target gear may be the first gear. In this case, the control device may adjust the gear in the operation instruction to be the first gear to obtain an adjusted operation instruction, and then send the adjusted operation instruction to the gear execution module without detecting that the moving speed of the mobile platform is reduced. The gear execution module may shift down the gear of the mobile platform to the first gear. In this way, the mobile platform passes through the uphill road in a low gear at a high moving speed. Therefore, the traction for enabling the mobile platform to pass through the uphill road may be increased, and the mobile platform may pass through the uphill road more quickly.

In another example, it is assumed that a current moving speed of the mobile platform is 10 km/h. If the control device determines, based on sensor data, that the mobile platform is currently on a turning road, the sensor data may be obtained, where the sensor data may include driving environment information. For example, the driving environment information may include turning information of the turn road. The turning information may be obtained by a video sensor or an IMU. The turning information may include a turning angle, length, and the like of the turning road. Further, the control device may determine a target gear of the mobile platform based on the current moving speed of the mobile platform and the turning information. For example, the target gear may be the third gear. In this case, the control device may adjust the gear in the operation instruction to be the third gear to obtain an adjusted operation instruction, and then sends the adjusted operation instruction to the gear execution module without detecting that the moving speed of the mobile platform is increased.

The gear execution module may shift up the gear of the mobile platform to the third gear. In this way, the mobile platform may pass through the turning road in a high gear at a low moving speed. Therefore, fuel consumption of the mobile platform is reduced, and energy efficiency is higher.

Figure 13:
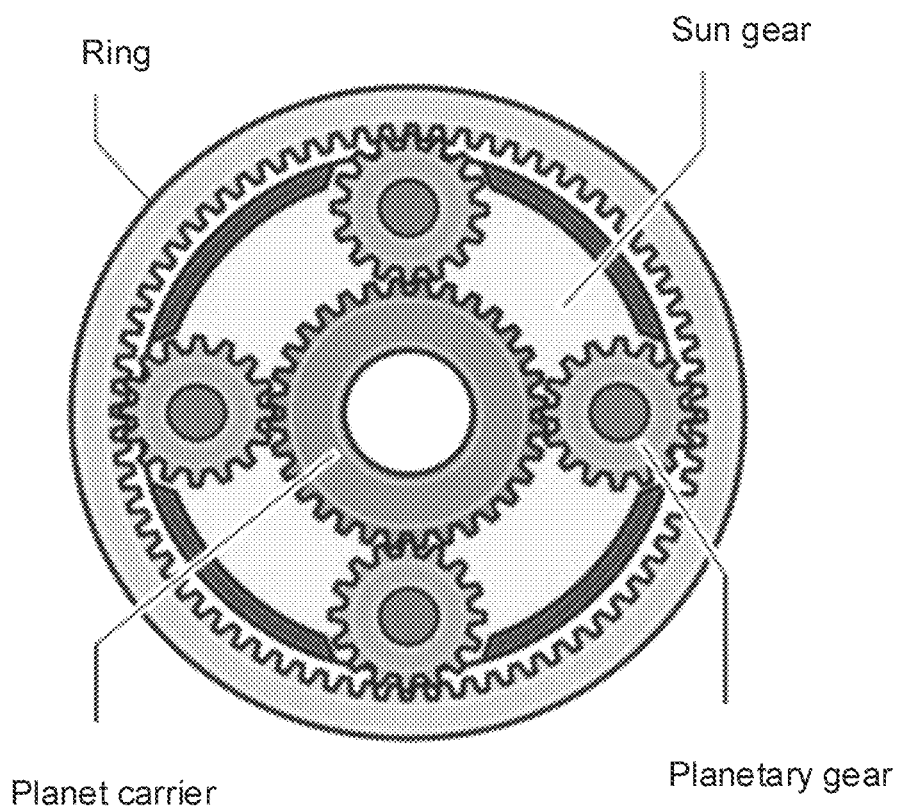
FIG. 13 is a structural diagram of a gearbox of a mobile platform according to some exemplary embodiments of the present disclosure.

In some exemplary embodiments, the gear execution module may be a gearbox. A structure of the gearbox of a mobile platform is shown in FIG. 13. The gearbox may be implemented by a planetary gear system. A central axis of the planetary gear system is a sun gear, which is surrounded by planetary gears. To hold the planetary gears that rotate around the sun gear, one side of a planet carrier functions as a support to carry the planetary gears, and the other side of the planet carrier performs coaxial power transmission. The outermost ring of the planetary gear system is an internal gear (also referred to as a ring gear). To improve the power transmission capability, some planetary gear sets are changed to two sets of pinions to transmit power to each other, where one set is in contact with the sun gear, and the other set is in contact with the ring gear. This is referred to as a double-pinion planetary gear set.

Figure 14:
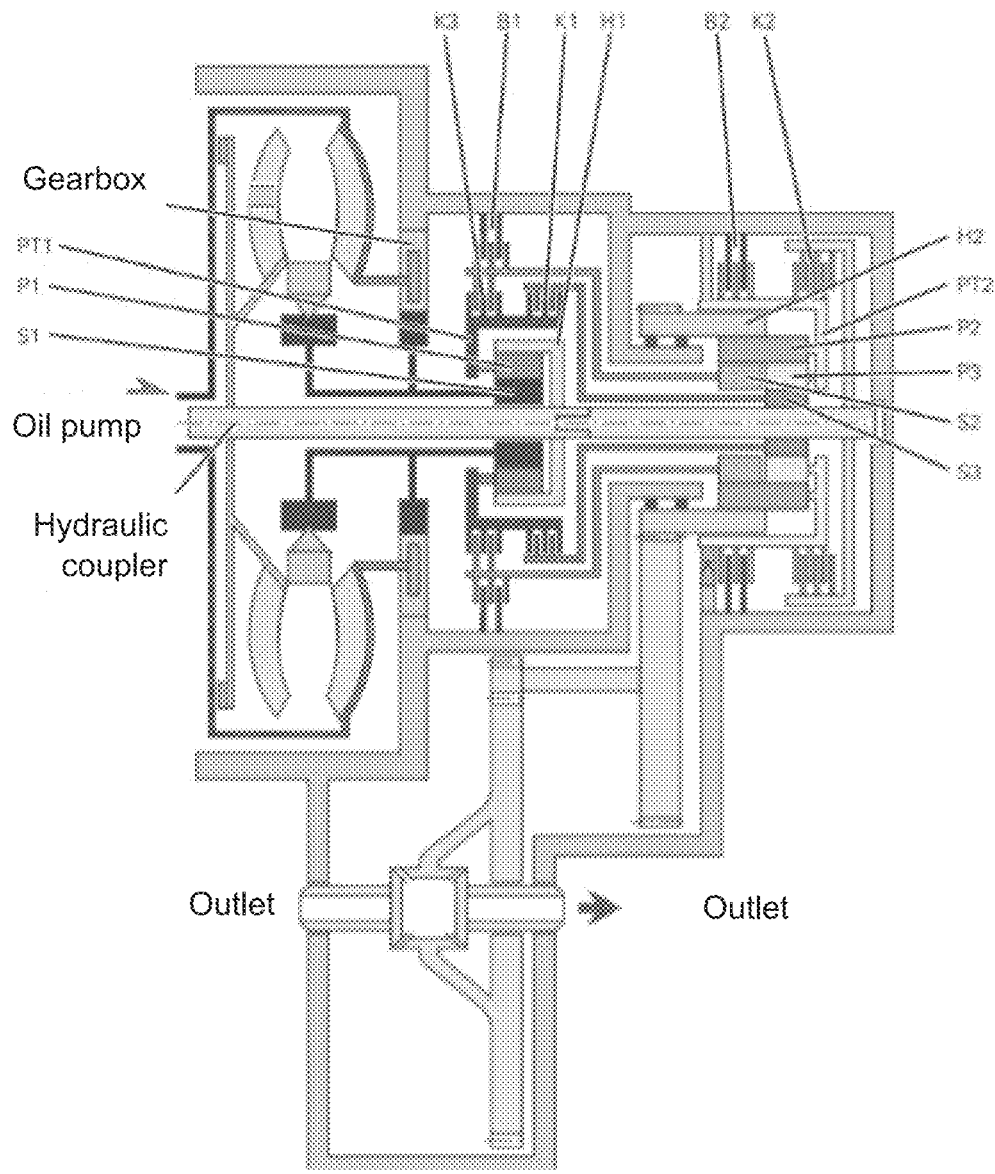
FIG. 14 is a schematic diagram of a gearbox of a mobile platform according to some exemplary embodiments of the present disclosure.

In some exemplary embodiments, the connection relationship of an accelerator box, an oil pump, and a hydraulic coupler(s) of a mobile platform is shown in FIG. 14, as arranged in sequence from left to right, the hydraulic coupler connected to an engine, the oil pump next to the hydraulic coupler, and then the power is transmitted to a first planetary gear set (namely, the gearbox). As described above, the gearbox includes a sun gear S1, a planetary gear P1, a planet carrier PT1, and a ring gear H1. On the right side of the gearbox is a compound planetary gear set. The two planetary gear sets share a ring gear H2, but each set has its own two planetary gears P2/P3, a planet carrier PT2, and two sun gears S2/S3. 6 forward gears/1 reverse gear are formed by various combinations of brake B1/B2 and clutch K1/K2/K3 composed of different multi-disc clutches.

The foregoing descriptions are merely specific implementations of the present disclosure, and are not intended to limit the scope of protection of the present disclosure. Any equivalent modification or replacement conceived of by a person skilled in the art within the technical scope disclosed in the present disclosure shall fall within the scope of protection of the present disclosure. Therefore, the scope of protection of the present disclosure shall be based on the scope of protection of the claims.

What is claimed is:

1. A driving device control method, comprising:
   determining whether a driving device is currently in an automatic driving state;
   receiving an output signal of an acceleration controller in real time upon determining that the driving device is in the automatic driving state;
   generating a simulated acceleration control signal based on the output signal of the acceleration controller; and
   controlling a drive apparatus of the driving device based on the simulated acceleration control signal, wherein the receiving of the output signal of the acceleration controller in real time includes:
   obtaining an operation value of operating the acceleration controller by a user, and
   generating the output signal based on the operation value.

2. The method according to claim 1, wherein the controlling of the drive apparatus of the driving device based on the simulated acceleration control signal includes:
   obtaining an acceleration preference mode of the user for acceleration control; and obtaining an acceleration time, an acceleration pace, and a desired speed based on the acceleration preference mode and the simulated acceleration control signal.

3. The method according to claim 2, wherein the obtaining of the acceleration preference mode of the user for acceleration control includes:
obtaining the acceleration preference mode manually set by the user; or
obtaining driving habit data of the user by using a plurality of sensors, generating a corresponding acceleration preference mode of the user based on the driving habit data, and automatically configuring the corresponding acceleration preference mode as the acceleration preference mode of the user.

4. The method according to claim 1, wherein the generating of the corresponding output signal based on the operation value includes:
searching a preset value-acceleration correspondence table to obtain the simulated acceleration control signal based on the operation value; or
calculating the simulated acceleration control signal in real time based on the operation value.

5. The method according to claim 1, wherein the receiving of the output signal of the acceleration controller in real time includes:
receiving, in real time, an output signal from operating of at least one of an electric accelerator pedal, a fuel accelerator pedal, a hybrid accelerator pedal, an electric brake pedal, a fuel brake pedal, or a hybrid brake pedal by a user.

6. The method according to claim 1, wherein the determining of whether the driving device is currently in the automatic driving state includes:
determining whether a vehicle, boat, or manned aircraft currently being piloted is in the automatic driving state.

7. The method according to claim 6, wherein
the driving device is a vehicle; and
the controlling of the drive apparatus of the driving device based on the simulated acceleration control signal includes:
obtaining a current driving environment of the vehicle, wherein the current driving environment includes a quantity of surrounding vehicles, a distance between vehicles, a real-time traffic condition, and road characteristics,
calculating, based on the current driving environment, a driving safety factor conforming to safe driving, and
controlling the simulated acceleration control signal based on the driving safety factor to limit a driving speed.

8. The method according to claim 7, wherein the calculating, based on the driving environment, of the driving safety factor conforming to safe driving includes:
calculating the driving safety factor conforming to safe driving based on at least one of
the quantity of surrounding vehicles,
the distance between vehicles,
the real-time traffic condition, or
the road characteristics.

9. The method according to claim 8, further comprising:
after controlling the simulated acceleration control signal based on the driving safety factor to limit the driving speed,
providing a user with information of limiting the driving speed, and prompting the user to perform safe driving;
detecting whether the user operates the acceleration controller to expect to increase the driving speed; and
upon detecting that the user operates the acceleration controller, stop receiving, based on the driving safety factor, the output signal of the acceleration controller in real time within a preset time period.

10. The method according to claim 7, wherein the obtaining of the current driving environment includes:
obtaining a first driving speed of the vehicle, and obtaining a second driving speed of a another vehicle or an obstacle ahead of the vehicle;
obtaining a target distance between the vehicle and the another vehicle or the obstacle; and
adjusting the simulated acceleration control signal based on the target distance, the first driving speed, and the second driving speed to limit the driving speed.

11. The method according to claim 10, wherein the adjusting of the simulated acceleration control signal based on the target distance, the first driving speed, and the second driving speed to limit the driving speed includes:
determining whether the target distance is less than a preset safety threshold; and
adjusting the simulated acceleration control signal to a negative value to decrease the driving speed upon determining that the target distance is less than the preset safety threshold.

12. The method according to claim 11, wherein the adjusting of the simulated acceleration control signal to the negative value to decrease the driving speed includes:
adjusting the simulated acceleration control signal to the negative value to control the driving speed to be equal to the second driving speed, less than the second driving speed, or equal to zero so that the vehicle stops.

13. The method according to claim 1, wherein
the driving device is a vehicle; and
the controlling of the drive apparatus of the driving device based on the simulated acceleration control signal includes:
obtaining a speed limit of a current road section and a current real-time speed of the vehicle,
calculating a speed difference based on the speed limit and the real-time speed,
calculating an acceleration time based on the simulated acceleration control signal and the speed difference, and
controlling, based on the acceleration time, a driving speed resulted from acceleration of the vehicle not to exceed the speed limit.

14. The method according to claim 13, wherein the obtaining of the speed limit of the current road section includes at least one of the following:
obtaining the current road section through positioning, and obtaining the speed limit from a local or network road database;
obtaining the speed limit and the real-time speed of the vehicle by using navigation software;
obtaining the speed limit by using a mobile communication device in communication with the vehicle via a network; or
obtaining the speed limit by using a camera to photograph a speed limit sign of the current road section.

15. A driving device control apparatus, comprising:
at least one storage medium storing a set of instructions for driving device control; and
at least one processor in communication with the at least one storage medium, wherein during operation, the at least one processor executes the set of instructions to:
determine whether a driving device is currently in an automatic driving state, receive an output signal of an acceleration controller in real time upon determining that the driving device is in the automatic driving state, generate a simulated acceleration control signal based on the output signal of the acceleration controller, and control a drive apparatus of the driving device based on the simulated acceleration control signal, wherein to receive the output signal of an acceleration controller in real time, the at least one processor further executes the set of instructions to:

obtain an operation value of operating the acceleration controller by a user; and generate the output signal based on the operation value.

16. A driving device, comprising:

at least one storage medium storing a set of instructions for driving device control; and at least one processor in communication with the at least one storage medium, wherein during operation, the at least one processor executes the set of instructions to:

determine whether the driving device is currently in an automatic driving state, receive an output signal of an acceleration controller in real time upon determining that the driving device is in the automatic driving state, generate a simulated acceleration control signal based on the output signal of the acceleration controller, and control a drive apparatus of the driving device based on the simulated acceleration control signal, wherein to receive the output signal of an acceleration controller in real time, the at least one processor further executes the set of instructions to:

obtain an operation value of operating the acceleration controller by a user; and generate the output signal based on the operation value.

17. The driving device according to claim 16, wherein to control the drive apparatus of the driving device based on the simulated acceleration control signal, the at least one processor further executes the set of instructions to:

obtain an acceleration preference mode of the user for acceleration control; and obtain an acceleration time, an acceleration pace, and a desired speed based on the acceleration preference mode and the simulated acceleration control signal.

18. The driving device according to claim 17, wherein to obtain an acceleration preference mode of the user for acceleration control, the at least one processor further executes the set of instructions to:

obtain the acceleration preference mode manually set by the user; or obtain driving habit data of the user by using a plurality of sensors, generate a corresponding acceleration preference mode of the user based on the driving habit data, and automatically configure the corresponding acceleration preference mode as the acceleration preference mode of the user.

* * * * *